Dec. 3, 1940.   R. O. DAY   2,224,006
HEAT-TREATING APPARATUS
Filed Oct. 16, 1937   2 Sheets-Sheet 1
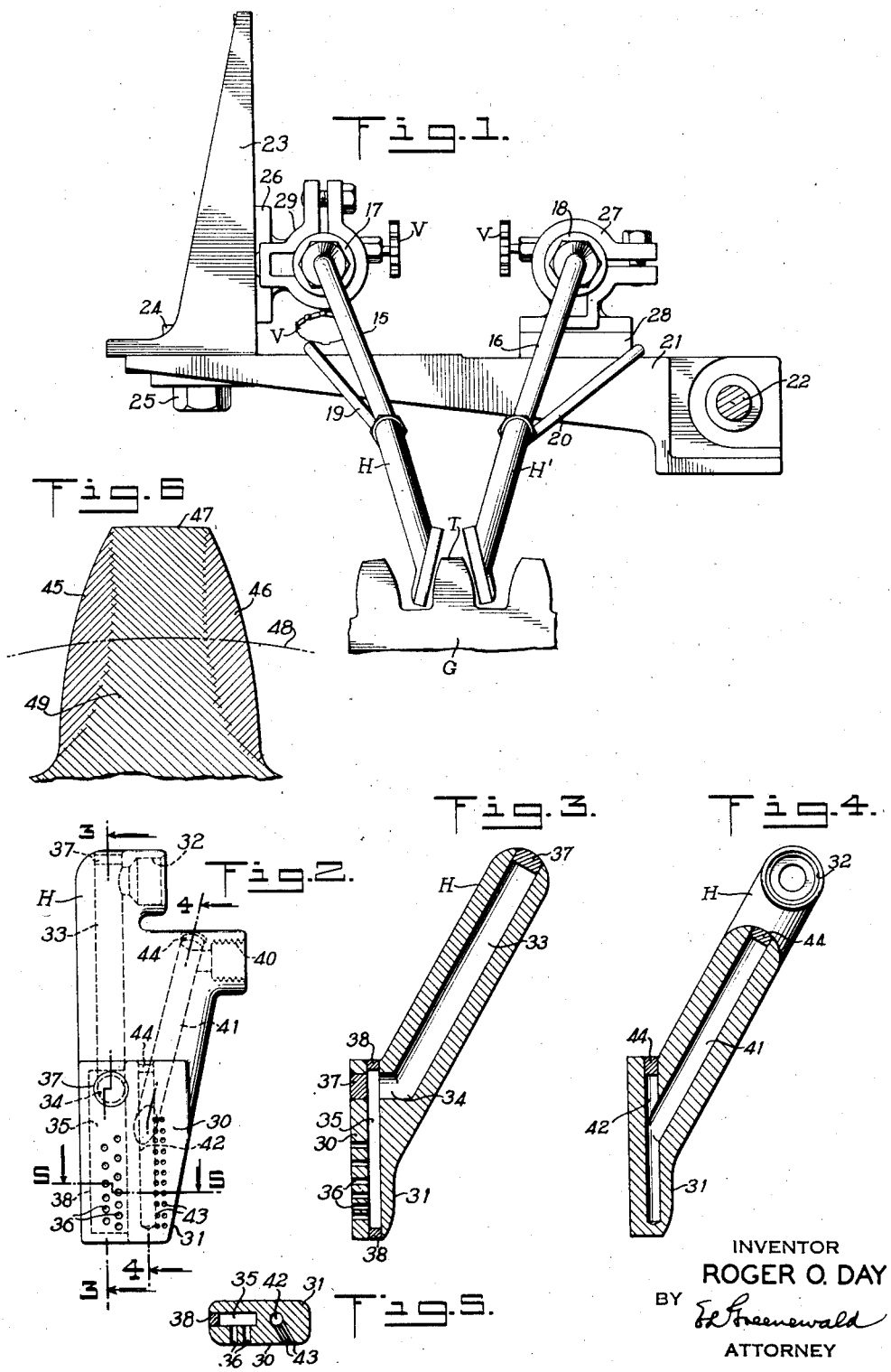
INVENTOR
ROGER O. DAY
BY
ATTORNEY Dec. 3, 1940.  R. O. DAY  2,224,006
HEAT-TREATING APPARATUS
Filed Oct. 16, 1937  2 Sheets-Sheet 2

INVENTOR
ROGER O. DAY
BY
ATTORNEY

Patented Dec. 3, 1940

2,224,006

UNITED STATES PATENT OFFICE 2,224,006

HEAT-TREATING APPARATUS

Roger O. Day, Westfield, N. J., assignor, by mesne assignments, to Oxweld Acetylene Company, a corporation of West Virginia Application October 16, 1937, Serial No. 169,373

3 Claims. (Cl. 158—27.4)

This invention relates to heat-treating apparatus, and more particularly to apparatus for heat-treating metal bodies, such as blowpipe heads adapted to direct a plurality of heating flames against a surface of a metal body. The apparatus of this invention is particularly useful in the heat-treatment, or hardening, of the wearing surfaces of gear teeth, although it is to be understood that use thereof is not limited to the treatment of gear teeth.

Heretofore, gear teeth have been hardened by utilizing a single blowpipe, usually an ordinary welding blowpipe, but the heat applied therefrom cannot be accurately controlled to obtain a uniform heating effect over the surface of the tooth and retain a tough, unhardened core of the most desirable shape. A non-uniformity of heating results in non-uniformity of hardening, with the result that a greater amount of wear will occur at some points, such as adjacent the root, than at others, such as adjacent the top. Furthermore, if a single blowpipe flame is applied to the surface of a gear tooth adjacent the pitch circle, the hardened portion usually extends into the tooth for a considerable distance, and reduces the cross-sectional area of the tough, unhardened core to such an extent that the core at that point is not well adapted to resist impact and shock. Moreover, if a single blowpipe flame is applied to the face of the tooth, i. e. at a point closer to the top of the tooth or "top land," an overheating of the top results, and internal strains and a considerable decrease in ductility result, thereby producing a tendency for the tooth to chip or crack.

The principal objects of this invention are to provide heat-treating apparatus by means of which a gear tooth may be treated to produce hardened wearing surfaces and a tough, unhardened core and top; to provide apparatus for heat-treating a metal body by which a surface portion to be hardened is heated uniformly; and to provide heat-treating apparatus, such as a blowpipe head, which is particularly adapted to direct a plurality of high temperature heating flames against a surface of a metal body. Other objects and novel features of this invention will become apparent from the following description and accompanying drawings, in which:

Fig. 1 is a partial end view of a gear and apparatus constructed in accordance with this invention, illustrating the heat-treatment of the surfaces of a gear tooth;

Fig. 2 is a front view of a blowpipe head of the apparatus of Fig. 1;

Figure 7:
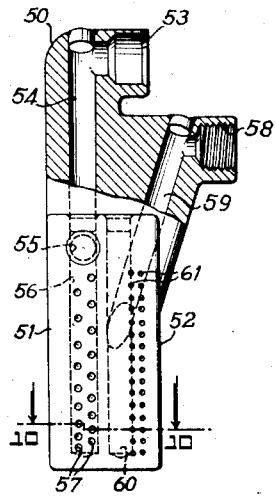
Figure 8:
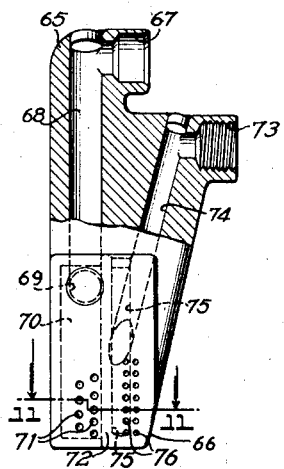
Figure 9:
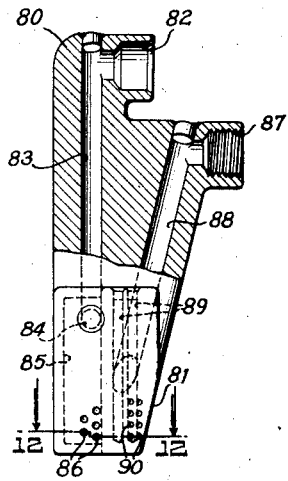
Figure 10:
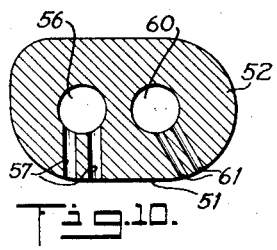
Figure 11:
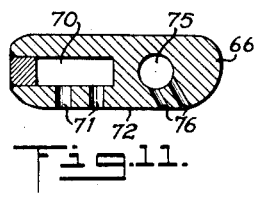
Figure 12:
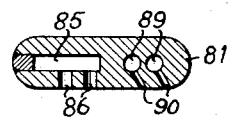

Figs. 3 and 4 are vertical sectional views taken along the lines 3—3 and 4—4, respectively, of Fig. 2;

Fig. 5 is a horizontal sectional view taken along the line 5—5 of Fig. 2;

Fig. 6 is a cross-sectional view of a gear tooth heat-treated in accordance with the principles of this invention;

Figs. 7, 8, and 9 are front views, partially in section, of alternative forms of blowpipe heads included within this invention; and Figs. 10, 11, and 12 are enlarged horizontal sectional views taken along the lines 10—10, 11—11, and 12—12, respectively, of Figs. 7, 8, and 9, respectively.

In accordance with a method which the apparatus of this invention is particularly adapted to carry out, the wearing surfaces of a gear tooth are heated uniformly and preferably simultaneously by applying thereto high temperature heat of a controlled distribution, the amount of heat applied per unit of surface area being greater adjacent the root of the tooth, and progressively lesser toward the top of the tooth; the portions of the surfaces closely adjacent the top of the tooth are preferably heated only by conduction from the portions of the surfaces remote therefrom; and the top of the tooth, or "top land," is preferably heated insufficiently to produce hardening thereof. The surfaces are also preferably so heated that the hardened portion extends from the top to the root of the tooth, each hardened portion preferably being deepest adjacent the pitch circle or pitch line and progressively shallower along the face and flank towards the top and root of the tooth, respectively; but a tough, unhardened core is retained which has a cross-sectional area in a plane adjacent the pitch line no smaller than, and preferably substantially the same as, its cross-sectional area adjacent the top of the tooth.

The above method may be carried out by the apparatus illustrated in Fig. 1, in which two blowpipe heads H and H' are utilized in hardening the surfaces of a tooth T of a gear G. The blowpipe heads H and H' are substantially identical in construction except that the relative positions of the parts are transposed so that one is right hand and the other is left hand; and they receive a combustible mixture, such as a mixture of oxygen and acetylene, through conduits 15 and 16, respectively, which are suitably connected to the bodies or handles 17 and 18 of conventional oxy-acetylene blowpipes provided with valves V for controlling the flow and proportions of the combustible mixture. The heads H and H' receive a cooling and quenching medium, such as water, through conduits 19 and 20, respectively—the cooling medium being utilized also as a quenching medium to provide a more compact construction.

The blowpipes and heads are supported in operative relation with respect to the tooth T by a suitable holder which includes a slotted horizontal arm 21 secured to a rod 22. The head H is adjustable horizontally through a slotted vertical arm 23, slidable horizontally upon the arm 21, and adapted to be clamped at any desired point along the arm 21 by a bolt 24 and nut 25; and is adjustable vertically through a slide 26, slidable vertically along the arm 23 and adapted to be secured at any desired point along the arm 23 by suitable means similar to the bolt 24 and nut 25. The head H' is angularly adjustable through a clamp 27, within which the blowpipe body 18 is secured, and which is pivotally mounted upon a fixed boss 28 which is in turn mounted on the arm 21; and the head H is similarly angularly adjustable through a clamp 29, within which the blowpipe body 17 is secured, and which is attached to the slide 26.

The conduits 15 and 16 are preferably substantially S-shaped in form so that the holder and blowpipe bodies will be disposed at a sufficient distance back of and away from the heads H and H' and gear G to prevent possible interference with the operation or view of the operation by the operator.

The heads H and H' are moved across the width of the tooth in a direction outwardly from the drawing by suitable means, (not shown) such as the carriage of a lathe or a suitable carriage traversing a track. The traversing means for the blowpipe heads supports the rod 22 and is also preferably provided with vertical and horizontal adjusting means supporting the rod 22, so that vertical and horizontal adjustments of the blowpipes and heads as a unit with respect to the gear G and tooth T may be effected.

The right hand head H, shown in Figs. 3 to 6, is provided with a surface 30 which is inclined to the sides of the head and forms one surface of a lower portion 31, which forms a lower end of reduced thickness and permits the head to be inserted between two closely spaced gear teeth. The head H is also provided with an inlet 32 to which the combustible mixture conduit 15 may be connected, and passages 33 and 34 which lead the combustible mixture to a distributing chamber 35 in the lower end of the head. A plurality of heating gas outlets 36 of substantially equal diameter lead from the chamber 35, terminating in the surface 30, and are preferably disposed in staggered relation in substantially vertical rows, so that the heating jets produced will tend to overlap and produce a more even heating effect. In addition, the distance between centers of adjoining outlets 36 increases progressively from the lower to the upper end of each row. Outlets 36 are spaced progressively further apart upwardly from the lower end of each row, so that closely adjoining heating jets will apply a greater amount of heat adjacent the root of the tooth and a progressively lesser amount upwardly towards the top of the tooth.

The passage 34 may be disposed substantially perpendicularly to the chamber 35, so that the combustible mixture will not be projected directly into the upper of the outlets 36, and a uniform distribution of the combustible mixture to all of the outlets 36 will be obtained. The passage 33 may be drilled from the upper end of the head and the passage 34 from the surface 30, the ends of the passages being closed by suitable means, such as plugs 37 which are secured in the ends of the passages in a suitable manner, such as by welding or brazing. The distributing chamber 35 may be formed by a suitable slot in the lower portion of the head, the outer periphery of the slot being closed by a substantially U-shaped strip 38 secured to the head in a suitable manner, such as by welding or brazing.

The head H is also provided with an inlet 40, to which the cooling and quenching fluid conduit 19 may be connected and from which an inclined passage 41 leads downwardly through the head to a distributing chamber 42, disposed alongside of and substantially parallel to the combustible mixture distributing chamber 35. A plurality of quenching fluid outlets 43 lead from the distributing chamber 42, terminating in the inclined surface 30 of the head, and are preferably inclined rearwardly and away from the heating gas outlets, desirably at an angle of about 30°, so that the quenching jets will not interfere with the heating flames. The quenching outlets 43 are also disposed in a plurality of rows so as to obtain complete quenching without splashing and interference with the heating flames. Inasmuch as the quenching outlets are inclined at an angle to the direction in which the cooling and quenching fluid is discharged from the passage 41 into the chamber 42, it is unnecessary to provide a supplementary directing passage similar to the heating gas passage 34. The passage 41 and chamber 42 may be drilled from the top of the head and lower portion 31, and the open ends thereof closed by suitable means, such as plugs 44 which are secured therein in a suitable manner, such as by welding or brazing.

During operation, the surface 30 is usually disposed at an angle to the center line of the gear tooth so that the heating flames will be directed substantially normally onto the surfaces of the tooth. For the larger sizes of gear teeth, this angle is preferably substantially the pressure angle, which is 14½° for involute teeth. In addition, the heads H and H' are preferably so positioned with respect to the tooth T that the uppermost of the heating flames will impinge upon the faces at points which are spaced from the top of the tooth, so that the portions of the faces closely adjacent the top will be heated by conduction only, and overheating of the same will be avoided.

A heat-treated gear tooth, having hardened sectional areas of substantially the extent of portions 45 and 46 of the tooth of Fig. 6, will be produced when the heads H and H' are moved across the width of the tooth T in a direction outwardly from the drawing so as to heat and cool successive portions of the surfaces thereof. In such a tooth, the top or "top land" of the tooth, such as the top 47 of the tooth of Fig. 6, will be unhardened; the hardened portions will be deepest adjacent the pitch circle or pitch line 48, being progressively shallower from the pitch line along the flank, or portion below the pitch line, to the root, and also being progressively shallower from the pitch line along the face, or portion above the pitch line, to the top of the tooth; and a tough, unhardened core, such as the core 49 which has substantially the same cross-sectional area in a plane adjacent the pitch circle 48 and adjacent the top 47, will be retained. In some instances, such as in the case of large gear teeth, the tough, unhardened core will have a cross-sectional area adjacent the pitch circle slightly larger than that adjacent the top; but in any event the cross-sectional area of the tough, unhardened core will not be substantially smaller adjacent the pitch circle than adjacent the top.

The heads H and H' are particularly adapted to be utilized in hardening the teeth of gears having a diametral pitch of about two. As shown in Figs. 7 and 10, a head 50 similar thereto but adapted to be utilized in hardening larger gear teeth, such as those of gears having a diametral pitch of one or less, is provided with an inclined surface 51 and a lower portion 52 of larger extent than the surface 30 and lower portion 31 of the head H. The head 50 is also provided with a combustible mixture inlet 53 and passages 54 and 55 which lead the combustible mixture to a distributing chamber 56. Here, a plurality of heating gas outlets 57 leading from the combustible mixture distributing chamber 56 and terminating in the inclined surface 51, are greater in number and extend over a greater distance than the outlets of the head H in order to heat the surfaces of a larger tooth. As before, the heating gas outlets are disposed in vertical rows and in staggered relation so as to produce a more even heating effect, and are spaced at increasing distances apart from the lower to the upper end of each row so as to produce a uniform heating effect upon the tooth.

The head 50 is also provided with a cooling and quenching fluid inlet 58 and a passage 59 which leads to a distributing chamber 60, disposed alongside of the heating gas distributing chamber 56. Leading from the chamber 60 are a plurality of outlets 61 which are disposed in a plurality of vertical rows and inclined rearwardly and away from the heating gas outlets in a manner similar to that previously described. Due to the increased size of the tooth to be treated, and the consequent increased size of the blowpipe head, the passage 56 may be formed by a hole drilled from the top of the lower portion 52 of the head 50, with the upper end thereof being closed by a suitable plug, instead of being formed by a slot as in the head H, but the method of construction of the head 50 is otherwise similar to that of the head H.

For heat-treating teeth of smaller gears, such as those having a diametral pitch of about three, blowpipe heads may be provided which are similar to head 65, illustrated in Figs. 8 and 11. The head 65, provided with a lower portion 66 which is thinner than the lower portion 31 of the head H to permit insertion between more closely spaced gear teeth, is also provided with a combustible mixture inlet 67 and passages 68 and 69 leading to a combustible mixture distributing chamber 70, from which heating gas outlets 71 lead. The outlets 71, lesser in number than the outlets of the head H and terminating in an inclined surface 72, are disposed in staggered relation in a plurality of rows and also are spaced from each other at increasing distances apart from the lower to the upper end of each row. The head 65 is also provided with a cooling and quenching fluid inlet 73 and a passage 74 which leads to a distributing chamber 75, disposed alongside of the heating gas distributing chamber 76. A plurality of quenching fluid outlets 76 lead from the distributing chamber and terminate in the surface 72, the outlets being disposed in a plurality of vertical rows and preferably being inclined at an angle rearwardly and away from the heating gas outlets, as previously described. The method of construction of the head 65 is similar to that of the head H.

For heat-treating still smaller teeth, such as those of gears having a diametral pitch of four or more, blowpipe heads may be provided which are similar to head 80, illustrated in Figs. 9 and 12. The head 80, provided with a lower portion 81 which is still thinner than the lower portion 31 of the head H, is also provided with a combustible mixture inlet 82 and passages 83 and 84 leading to a distributing chamber 85, from which heating gas outlets 86 lead. The heating gas outlets 86 are fewer in number than those of the heads previously described, but are similarly disposed in a plurality of vertical rows and in staggered relation, as well as being spaced at increasing distances apart from the lower to the upper end of each row. The head 80 is also provided with a cooling and quenching fluid inlet 87 and a passage 88 leading to a plurality of distributing chambers 89, from each of which a row of quenching outlets 90 lead. The outlets 90, as before, are preferably inclined at an angle rearwardly and away from the heating gas outlets. A plurality of distributing chambers 89 are utilized merely because of the smallness of the teeth to be treated and the attendant diminishment in size of the head, and the method of construction of the head 80 is otherwise similar to that of the head H.

Although a specific manner of producing the desired passages and chambers in the various blowpipe heads has been described, it is to be understood that other ways of producing the passages may be employed, and that various changes in the passages themselves may be made. It is to be further understood that other changes may be made which will not depart from the spirit and scope of this invention.

What is claimed is:

1. Apparatus for heat-treating a portion of a metal body comprising a blowpipe head having a group of outlets of substantially equal diameter adapted to deliver a plurality of heating flames across a surface portion of said body of predetermined extent, the centers of adjoining outlets being spaced at increasing distances apart from one end of said group to the other.

2. Apparatus for heat-treating a portion of a metal body comprising a blowpipe head having a combustible gas passage formed therein; and a plurality of outlets of substantially equal diameter leading from said passage, said outlets being disposed in at least one row and the distance between centers of adjoining outlets at one end of a row being greater than at the other end of said row.

3. Apparatus for heat-treating gear teeth comprising a blowpipe head having a lower end of reduced thickness adapted to fit between a pair of gear teeth, said head having a group of outlets of substantially equal diameter adapted to deliver a plurality of heating flames against the surface of one of said gear teeth and from a point adjacent the root to a point adjacent the top of such tooth, the centers of adjoining outlets being spaced at increasing distances apart from the lower to the upper end of said group so as to apply a greater amount of heat to said tooth adjacent the root than adjacent the top thereof.

ROGER O. DAY.